United States Patent [19]
Kang

[11] Patent Number: 6,072,794
[45] Date of Patent: Jun. 6, 2000

[54] DIGITAL TRUNK INTERFACE UNIT FOR USE IN REMOTE ACCESS SYSTEM

[75] Inventor: Kyung-Suk Kang, Kyonggi-do, Rep. of Korea

[73] Assignee: Daewoo Telecom Co., Ltd., Incheon, Rep. of Korea

[21] Appl. No.: 09/059,143

[22] Filed: Apr. 13, 1998

[30] Foreign Application Priority Data

Apr. 24, 1997 [KR] Rep. of Korea ...................... 97-15345
Apr. 24, 1997 [KR] Rep. of Korea ...................... 97-15346

[51] Int. Cl.[7] ................................ H04J 3/06; H04L 12/66
[52] U.S. Cl. ........................... 370/352; 370/375; 370/401; 370/503
[58] Field of Search ..................................... 370/352, 353, 370/354, 355, 356, 357, 375, 376, 377, 378, 401, 465, 466, 503, 509, 510, 512, 518; 375/220, 222, 242, 366, 368, 371, 373, 376

[56] References Cited

U.S. PATENT DOCUMENTS 5,124,980  6/1992  Maki ........................................ 370/498
5,212,688  5/1993  Gerbehy et al. ........................ 370/509

Primary Examiner—Chi H. Pham
Assistant Examiner—Kwang B. Yao
Attorney, Agent, or Firm—McCormick, Paulding & Huber LLP

[57] ABSTRACT

A digital trunk interface unit for interfacing with a digital trunk of a PSTN in the RAS for connecting the PSTN to a different network by a T1 or E1 trunk, comprises a plurality of line card slots; a plurality of E1 line cards inserted into the line card slots to provide an interface of an E1 trunk; a plurality of T1 line cards inserted into the line card slots to provide an interface of a T1 trunk; a digital switch; an R2 signaling part; a tone generator; a processor; a clock selector; a PLL; a frequency-divider; and a clock converter. Therefore, personal computers of the PSTN connected to the RAS by the trunk interface unit, can be connected to a packet network by a modem unit and a gateway, thereby being provided information services from information providers. Accordingly, the trunk interface unit of RAS can accommodate T1 and E1 trunk links within the same unit by exchanging only line cards, and process the line interface and signaling functions on the same unit, thereby implementing the RAS with low cost.

7 Claims, 5 Drawing Sheets a frequency-divider for frequency-dividing the reference clock and the main system clock, providing the frequency-divided reference clock to the PLL, and generating a plurality of system clocks including the E1 system clock from the frequency-divided main system clock;

a clock converter for converting the E1 system clock outputted from the frequency-divider into the T1 system clock and providing one of the E1 and T1 system clocks to the E1 or T1 line cards, according to a second control signal;

a digital switch for generating forward register data of a seized channel by switching time slots, transmitting PCM data received through each trunk to a modem unit, and transmitting the PCM data received from the modem unit and backward register data to a corresponding channel of the line cards, according to first control data;

an R2 signaling part for decoding the forward register data received from the digital switch according to an R2 signaling protocol, generating the backward register data according to second control data, and providing the generated backward register data to the digital switch; and a processor for generating the first control signal by discriminating a link state from the link state signals to provide the first control signal to the clock selector, generating the second control signal by discriminating the kind of the line cards inserted into the line card slots to provide the second control signal to the clock converter, performing a control sequence corresponding to the discriminated line cards, generating and providing the first control data for the time slot switching to the digital switch, generating and exchanging the second control data for the R2 signaling with the R2 signaling part.

DIGITAL TRUNK INTERFACE UNIT FOR USE IN REMOTE ACCESS SYSTEM

BACKGROUND OF THE INVENTION

1. Field of the Invention

The present invention relates to a trunk interface unit for use in a remote access system (RAS), and more particularly to a trunk interface unit for interfacing with a digital trunk of a public switched telephone network (PSTN) in the RAS for connecting the PSTN to a different network (for example, a packet network, Internet, etc.).

2. Description of the Prior Art

In general, a PSTN performs a circuit switching according to call requests from telephone subscribers to transmit voice signals to other subscribers on the network. A packet network is a communication network for sending digital data among computers by a packet switching. These networks can be integrated to a broadband integrated services digital network (B-ISDN). However, since the B-ISDN is composed of individual networks, a service exchanging, procedure among the networks is very complicate.

As is well-known, the PSTN is chiefly directed to telephone voice services. However, according as personal computers (PC) are widely used and various information providers (IP) using the packet network appear, a connection between the PSTN and the packet network is required. Accordingly, there is a need for the RAS for connecting the packet network to a domestic telephone line.

The RAS is connected to the PSTN by a T1 or E1 trunk and to the packet network by a protocol X.25. Conventionally, for the connection of the RAS to the PSTN, separated trunk interface units are needed according to the type of the trunk, that is, T1 or E1 trunk, and a block for transmitting subscribers' data and a block for performing an R2 signaling are separately provided. Therefore, the conventional trunk interface unit has a complicated circuit structure, thereby increasing its cost of production.

SUMMARY OF THE INVENTION

In view of the foregoing, it is an object of the present invention to provide a trunk interface unit for interfacing with a plurality of E1 or T1 trunks by exchanging only line cards only in the trunk interface unit therein.

It is another object of the present invention to provide a trunk interface unit including a block for performing an R2 signaling.

In order to achieve the above objects, the present invention provides a digital trunk interface unit comprising:

a plurality of line card slots;

a plurality of E1 line cards inserted into the line card slots, for extracting and outputting a clock from bit streams received thereinto, generating a link state signal on E1 trunks, and arranging E1 frames according to an E1 system clock, thereby providing an interface of the E1 trunks;

a plurality of T1 line cards inserted into the line card slots, for extracting and outputting a clock from bit streams received thereinto, generating a link state signal on T1 trunks, and arranging T1 frames according to a T1 system clock, thereby providing an interface of the T1 trunks;

a clock selector for selecting a clock among the clocks outputted from the line cards according to a first control signal, and providing the selected clock as a reference clock;

a PLL for generating a main system clock synchronized with a frequency-divided reference clock;

BRIEF DESCRIPTION OF THE DRAWINGS

The above and other objects, features, and advantages of the present invention mill be apparent from the following detailed description of the preferred embodiments of the invention in conjunction with the accompanying drawings, in which.

DESCRIPTION OF THE PREFERRED EMBODIMENT

Reference will now be made in detail to the present invention, examples of which are illustrated in the accompanying drawings. Wherever possible, the same reference numbers will be used throughout the drawings to refer to the same or like parts.

Figure 1:
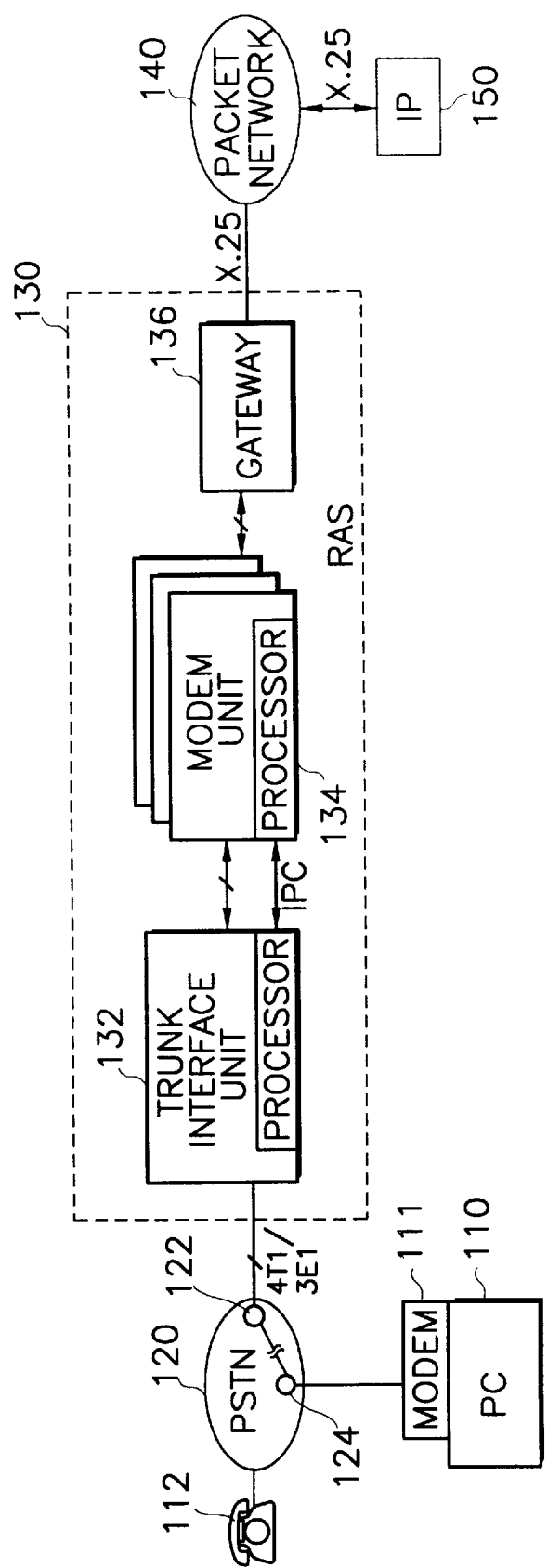
FIG. 1 is a simplified diagram showing a connection between PSTN and a packet network.

In FIG. 1, a PSTN 120 comprises a plurality of exchanges 122 and 124. The exchange 124 is connected to personal computers (PC) 110 by a modem 111 and the exchange 122 is connected to an RAS 130 by a T1 or E1 trunk. The RAS 130 is connected to a packet network 140 according to a protocol X.25. The packet network 140 is connected to various information providers (IP) 150. That is, the PSTN 120 is connected to the packet network 140 via the RAS 130 so that the information of the IP 150 can be provided to the PC 110.

Here, the RAS 130 controls the amount of traffics between the PSTN 120 and the packet network 140 and provides a connection function of a menu method by using its server. In the RAS 130 an efficient management of the billing system can be achieved by recording telephone numbers of subscribers connected to the network. In addition, the RAS 130 enables the subscribers to access data base (DB) distributed in the packet network 140.

The RAS 130 comprises a trunk interface unit 132 connected to the PSTN 120, a modem unit 134 for providing, the same terminal function as the modem 111 of the PC 110, and a gateway 136 for converting a protocol so as to connect the modem unit 134 to the packet network 140.

The trunk interface unit 132 is connected to the exchange 122 of the PSTN 120 by a T1 or E1 trunk to extract clocks for network synchronization and to switch four T1 connection into three E1 connection for the modem unit 134. The modem unit 134 is equipped with a multitude of modem chips (not shown).

Figure 2:
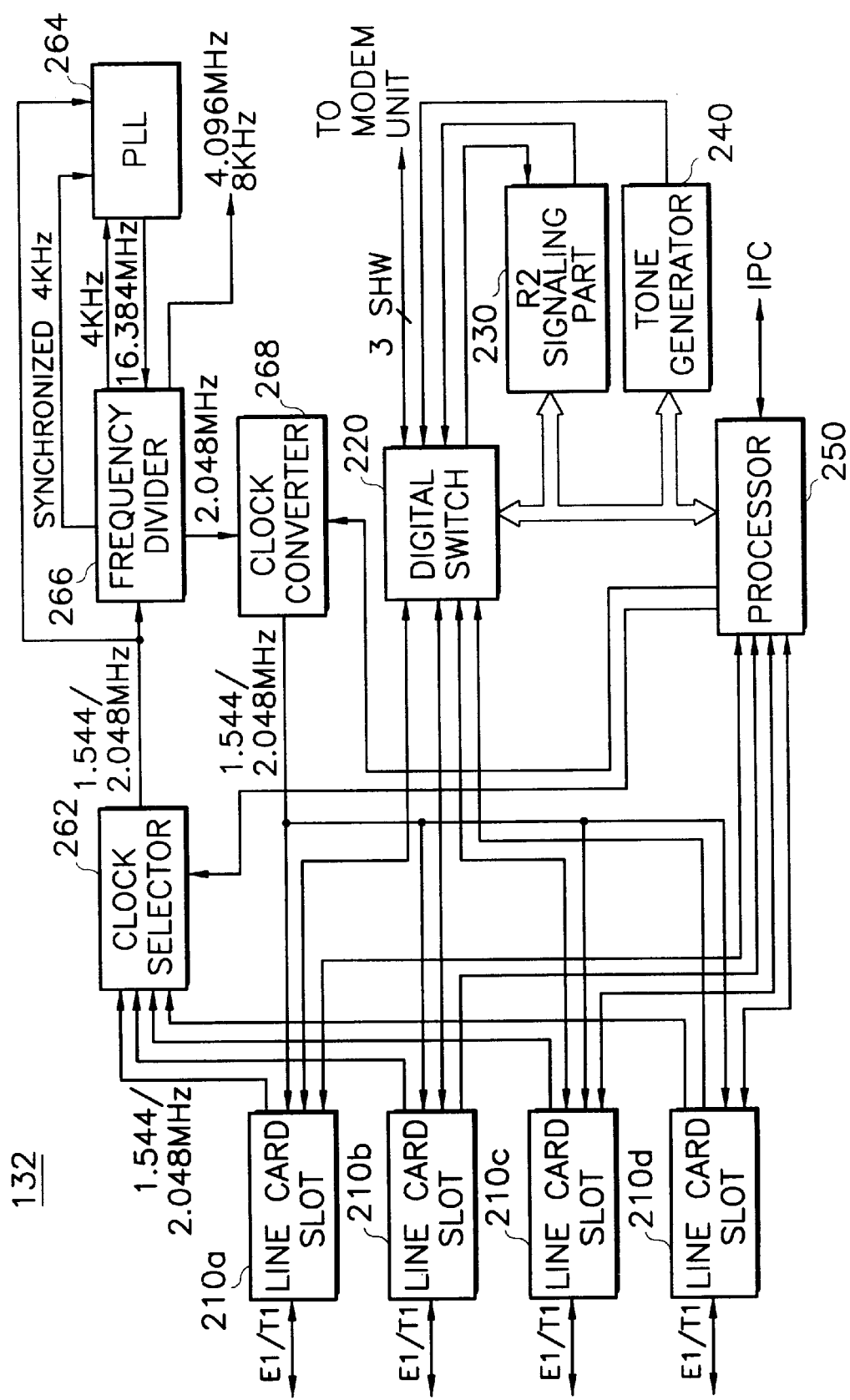
FIG. 2 is a block diagram illustrating a trunk interface unit in accordance with a preferred embodiment of the present invention.

In FIG. 2, the trunk interface unit 132 comprises a plurality of line card slots, for example four line card slots 210a to 210d, a digital switch 220, an R2 signaling part 230, a tone generator 240, a processor 250, a clock selector 262, a PLL 264, a frequency-divider 266, and a clock converter 268.

Referring to FIG. 2, E1 or T1 line cards can be inserted into the line card slots 210a to 210d. In case of using the T1 line card, four T1 line cards are inserted into the four line card slots 210a to 210d, while in case of using the E1 line card, three E1 line cards are inserted into three among the four line card slots 210a to 210d, in one trunk interface unit 132. Preferred embodiments of E1 and T1 line cards are shown in FIGS. 3 and 4, respectively.

Figure 3:
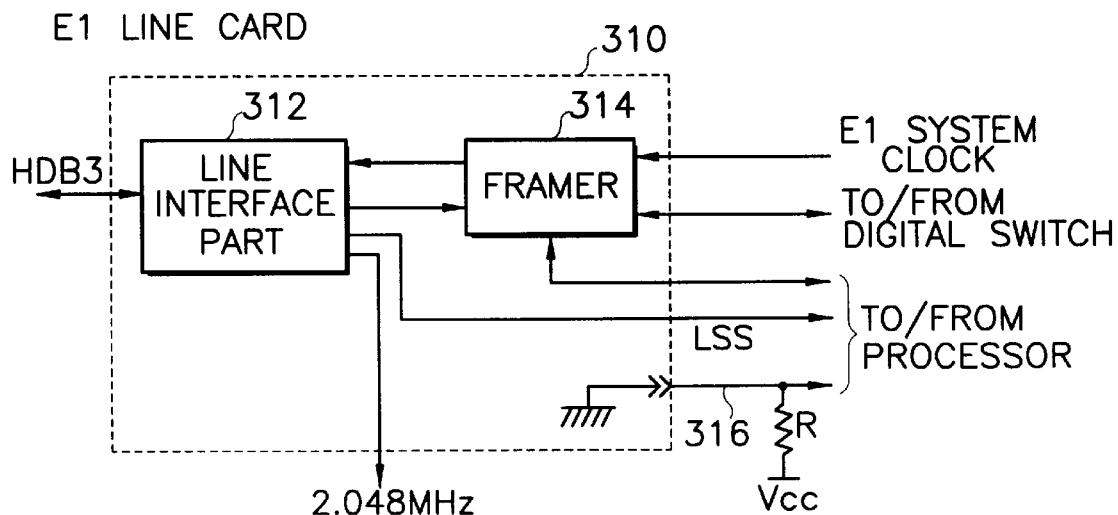
FIG. 3 is a detailed block diagram illustrating an E1 line card in accordance with a preferred embodiment of the present invention.

In FIG. 3, the E1 line card 310 comprises a line interface part 312 and a framer 314. The line interface part 312 receives bit streams sent by a HDB3 method through a trunk line, extracts a clock of 2.048 MHz, and checks the state of the trunk line to output a link state signal LSS. In addition, the line interface part 312 performs a line coding for the bit streams of TTL level by the HDB3 method, and sends the line-coded bit streams to the exchange 122 of the PSTN 120 through the trunk line. The framer 314 arranges the bit streams of TTL level received from the line interface part 312 according to a network-synchronized E1 system clock and outputs the arranged bit streams to the digital switch 220 so that the processor 250 can read signaling bits from the arranged E1 frames. In addition, the framer 314 combines and rearranges pulse-coded modulation (PCM) data received from the digital switch 220 and the signaling bits provided from the processor 250 to form E1 frames and output the E1 frames to the line interface part 312.

Figure 4:
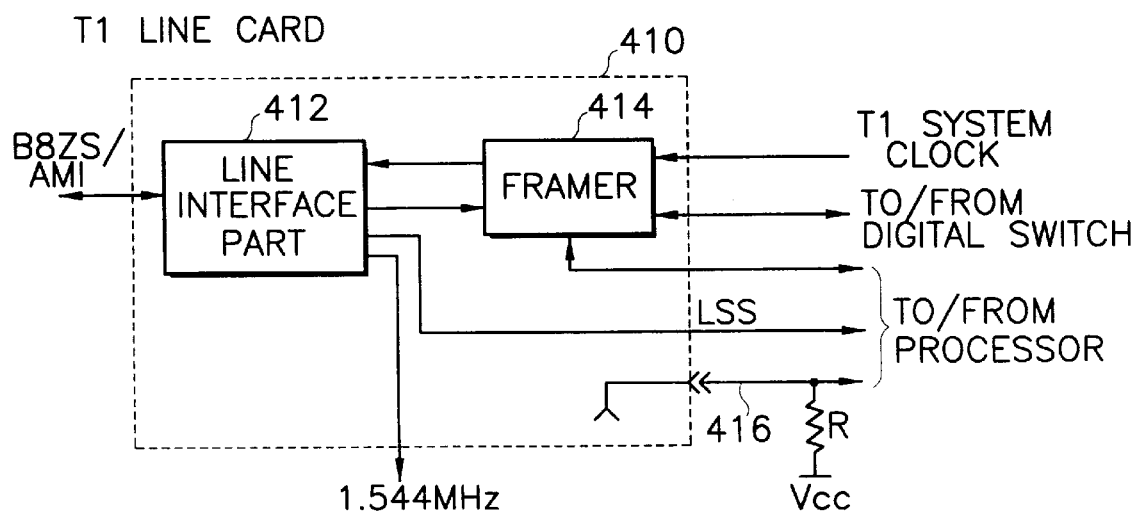
FIG. 4 is a detailed block diagram illustrating a T1 line card in accordance with a preferred embodiment of the present invention.

In FIG. 4, the T1 line card 410 comprises a line interface part 412 and a framer 414 The line interface part 412 receives bit streams sent by a B8ZS or AMI method through a trunk line, extracts a clock of 1.544 MHz, and checks the state of the trunk line to output a link state signal LSS. In addition, the line interface part 412 performs a line coding for the bit streams of TTL level by the B8ZS or AMI method, and sends the line-coded bit streams to the exchange 122 of the PSTN 120 through the trunk line. The framer 414 arranges the bit streams of TTL level received from the line interface part 412 according to a network-synchronized T1 system clock and outputs the arranged bit streams to the digital switch 220 so that the processor 250 can read signaling bits from the arranged T1 frames. In addition, the framer 414 combines and rearranges PCM data received from the digital switch 220 and the signaling bits provided from the processor 250 to form T1 frames and outputs the T1 frames to the line interface part 412.

As shown in FIGS. 3 and 4, in order to identify E1 and T1 line cards 310 and 410, a signal line 316 connected to the processor 250 is grounded for the E1 line card 310, whereas a signal line 416 connected to the processor 250 is opened for the T1 line card 410. Accordingly, the processor 250 checks the signal lines 316 and 416 to determine that the E1 line cards 310 are inserted in the line card slots 210a to 210c if a signal from the signal line 316 is 'low'. And the processor 250D determines that the T1 line cards 410 are inserted in the line card slots 210a to 210d if a signal from the signal line 416 is 'high'. Thus, the processor 250 executes programs corresponding to the respective line cards 310 and 410.

Referring to FIG. 2, the clock selector 262 receives four clocks of 1.544 MHz from the T1 line cards 410 when the T1 line cards 410 are inserted in the four line card slots 210a to 210d, selects one clock according to a control signal provided from the processor 250 and outputs the selected clock as a reference clock. On the other hand, the clock selector 262 receives three clocks of 2.048 MHz from the E1 line cards 310 when the E1 line cards 310 are inserted in the three line card slots 210a to 210c, selects one clock according to the control signal provided from the processor 250, and outputs the selected clock as the reference clock.

The PLL 264 outputs a network-synchronized system clock (16.384 MHz) by comparing a frequency-divided reference clock (4 KHz) provided from the frequency-divider 266 with a synchronized clock of 4 KHz.

The frequency-divider 266 divides the frequency of the reference clock outputted from the clock selector 262 into 4 KHz to provide the frequency-divided reference clock to the PLL 264, and divides the frequency of the system clock (16.384 MHz) outputted from the PLL 264 to provide the synchronized clock of 4 KHz to the PLL 264. In addition, the frequency-divider 266 generates various clocks (for example, 8 KHz, 2.048 MHz, 4.096 MHz, etc) to provide the clock converter 268 and the modem unit 134 of the RAS 130.

The clock converter 268 provides a clock of 2.048 MHz or 1.544 MHz to the framer 314 or 414, according to a control signal provided from the processor 250 in order to interface the E1 or T1 trunk by one trunk interface unit (132 of FIG. 1). Namely, the clock converter 268 transmits the clock of 2.048 MHz provided from the frequency-divider 266 to the E1 line card (310 of FIG. 3) when using the E1 trunk, whereas the clock converter 268 converts the clock of 2.048 MHz provided from the frequency-divider 266 into the clock of 1.544 MHz and outputs the clock of 1.544 MHz when using the T1 trunk. For these, the clock converter 268 receives a control signal for indicating which of the E1 and T1 line cards are inserted in the line card slots 210a to 210d, from the processor 250.

The digital switch 220 exchanges time slots according to control data of the processor 250 to transmit forward register data of the seized time slots to the R2 signaling part 230, transmits the PCM data received through the trunk lines to the modem unit (134 of FIG. 1) through three sub-highways, and switches channels from a format of the four T1 lines to that of the three E1 lines. In addition, the digital switch 220 transmits the PCM data received through the modem unit (134 of FIG. 1) to the trunk lines and transmits tone data provided from the tone generator 240 and backward register data from the R2 signaling part 230 to the corresponding channels of the corresponding line cards.

Figure 5:
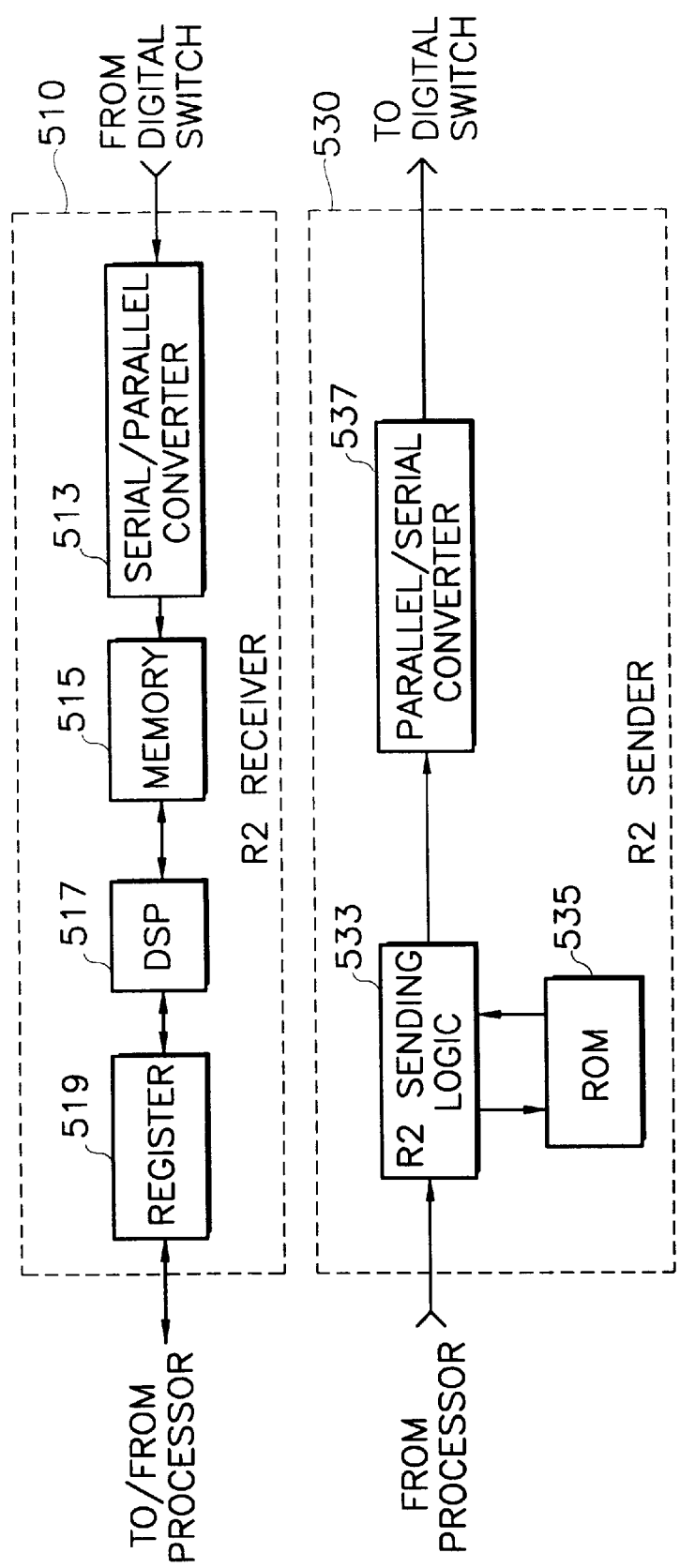
FIG. 5 is a detailed block diagram illustrating an R2 signaling part in FIG. 2.

The R2 signaling part 230, as shown in FIG. 5, comprises an R2 receiver 510 and an R2 sender 530. The R2 receiver 510 comprises a serial/parallel converter 513, a memory 515, a digital signal processor (DSP) 517, and a register 519. The R2 sender 530 comprises an R2 sending logic 533, a ROM 535, and a parallel/serial converter 537.

Referring to FIG. 5, the R2 receiver 510 receives and decodes the forward register data for the seized channels from the digital switch 220, and transmits the R2 signaling information to the processor 250. The processor 250 reads the received R2 signaling information and controls the R2 sender 530 to provide backward register data corresponding to forward register data according to the R2 signaling protocol whenever the processor 250 performs the R2 signaling processing routine.

Namely, the serial/parallel converter 513 of the R2 receiver 510 receives serial data from each time slot of the seized channels through the digital switch 220, converts the received serial data to parallel data, and stores sequentially the converted parallel data into the memory 515. Here, the serial data from each time slot of the seized channels through the digital switch 220 can be supplied directly to the DSP 517. The DSP 517 reads and analyzes the parallel data stored in the memory 515, decodes the forward register data and stores the signaling information corresponding to the forward register data to the register 519. The processor 250 reads and processes the signaling information recorded in the register 519 according to the R2 signaling protocol whenever the processor 250 performs the R2 signaling routine. In addition, the processor 250 exchanges information with other processors through the inter-processor communication (IPC) to perform the protocol, and transmits the signaling information to the R2 sender 530 to send the backward register data corresponding to the state of a called user and the received forward register data to the exchange (122 of FIG. 1) of the PSTN (120 of FIG. 1).

The ROM 535 of the R2 sender 530 stores all backward register data for the R2 signaling and provides corresponding backward register data to the R2 sending logic 533 when addresses are inputted. The R2 sending logic 533 receives and stores the signaling control information from the processor 250, generates a particular address according to the signaling control information, reads the backward register data from the ROM 535, and outputs them to the parallel/serial converter 537. The parallel/serial converter 537 converts the parallel backward register data to the serial data and outputs the converted data to the digital switch 220.

Referring to FIG. 2, the tone generator 240 generates various tones representing the state of a called user (for example, a busy tone, a ring-back tone, a congestion tone, etc) under the control of the processor 250, and sends the tones to a calling user of the corresponding channel through the digital switch 220. The processor 250, which comprises the memory (not shown) for storing programs and data, peripheral devices (not shown) for IPC, and a microprocessor (not shown), monitors the state of the trunk lines, controls the digital switch 220, and processes the R2 signaling.

Figure 6:
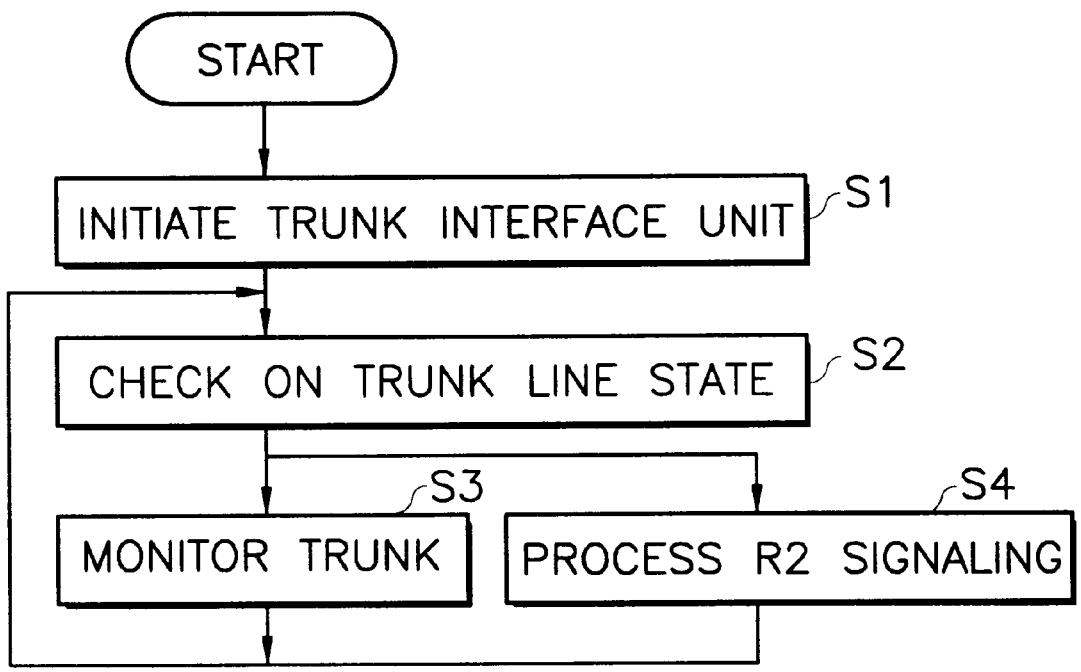
FIG. 6 is a flowchart explaining an operation of a processor in FIG. 2.

The processing operation of the processor 250, as shown in FIG. 6, comprises an unit initialization routine S1, a trunk line state check routine S2, a trunk monitoring routine S3, and an R2 signaling processing routine S4. In addition, when a communication path is established by the R2 signaling, the PC 110 is connected to the packet network 140 by the communication path for information service.

Next, an operation according to the preferred embodiment of the present invention will be described.

First of all, structures of the T1 and E1 frames used in the present invention and the R2 signaling will be described in detail.

The T1 frame has a transmission rate of 1.544 Mbps by multiplexing 24 PCM channels with frame bits and forms a multiframe by multiplexing 12 T1 frames. Here, the 8th bit in each channel of the 6th frame of the multiframe is 'A' bit and the 8th bit in each channel of the 12th frame of the same is 'B' bit. In addition, the signaling information of each channel is transmitted by the 'A' and 'B' bits. AMI or B8ZS is used as the line code regarding the T1 frame.

The E1 frame has a transmission rate of 2.048 Mbps by multiplexing 32 PCM channels. The 30 channels of them are used for transmitting subscribers' data and the two channels are used for frame synchronization and signaling. Namely, 16 E1 frames forms a multiframe. Of the multiframe, the second to 16th frames are used for the signaling bits (A,B,C and D) of each channel (30 channels). HDB3 is used as the line code regarding the E1 frame.

Meanwhile, the R2 signaling method, as a type of the inter-office trunk line method, uses the forward register signal transmitted from the calling user to the called user and the backward register signal transmitted from the called user to the calling user. The register signals are defined by a combination of particular frequency signals. The register signals in the R2 signaling are sent by a forced-identification signaling procedure after combining frequencies within 5 to 6 bands between input and output R2 registers. For example, the forward register signal uses 1380, 1500, 1620, 1740, 1860, and 1980 Hz and the backward register signal uses 1140, 1020, 900, 780, and 660 Hz.

Referring to FIG. 6, when electric power is applied to the processor 250, the unit initialization routine S1 is performed. In performing the unit initialization routine S1, the type of the line cards is determined. For example, when the T1 line card (410 of FIG. 4) is inserted in each of the line card slots (210a to 210d of FIG. 2), the signal line (416 of FIG. 4) becomes 'high'. On the other hand, when the E1 line card (310 of FIG. 3) is inserted in each of the line card slots 210a to 210c, the signal line (316 of FIG. 3) becomes 'low'. Accordingly, the processor 250 identifies the type of the inserted line cards by checking the signal line 316 or 416.

When electric power is applied to the inserted cards, the link state signal (LSS of FIGS. 3 and 4) is provided to the processor 250 after the state of the trunk line is checked. The processor 250 determines the state of each trunk line according to the link state signal LSS and outputs the control signal for selecting the reference clock to the clock selector (262 of FIG. 2). In addition, the processor 250 outputs the control signal to the clock converter (268 of FIG. 2) in order to provide the corresponding clock according to the type of the line cards inserted in the line card slots 210a to 210d. By outputting the control signal and initializing the inserted line cards, the R2 signaling part (230 of FIG. 2) and the digital switch (220 of FIG. 2), a preparation for interfacing with the trunks of the PSTN (120 of FIG. 1) is finished.

The clock selector 262 receives clocks reproduced from each line card and selects the reference clock according to the control signal. The PLL (264 of FIG. 2) synchronizes a signal oscillated from the inside of the PLL 264 with the frequency-divided reference clock. The frequency-divider (266 of FIG. 2) provides the frequency-divided reference clock to the PLL 264 after dividing the frequency of the reference clock. In addition, the frequency-divider 266 provides various clocks (2.048 MHz, 8 KHz, 4.096 MHz, etc.) necessary for the system by dividing the frequency of the oscillation clock outputted from the PLL 264.

As described above, when the system clock is provided normally, the framers 314 and 414 of the line cards form the E1 and T1 frames, respectively, or arrange the frames by rearranging the received data according to the network-synchronized clock. After the frames are arranged, the processor 250 reads or inserts the signaling bits.

Meanwhile, the processor 250 monitors each trunk line by performing the trunk line state check routine (S2 of FIG. 6) when the initialization is finished. In addition, the processor 250 performs the trunk monitoring routine (S3 of FIG. 6) at a predetermined interval and performs the R2 signaling processing routine (S4 of FIG. 6) as necessary. At this time, the trunk line state check routine S2 functions to indicate an alarm by monitoring each trunk line.

In the trunk monitoring routine (S3 of FIG. 6), which is performed at an interval of 8 msec, the processor 250 determines a seizing request by monitoring the signaling bits of each frame in which the multiframe synchronization is established at each framer 314 or 414 of each line card.

Namely, when the trunk monitoring routine S3 is performed, the processor 250 monitors A, B, C, and D bits allocated to the 16th channels of the 2nd to 16th frames of the multiframe formed by multiplexing the 16 frames, in the case of the E1 link, whereas it monitors 'A' bit allocated to the 8th bit of each channel of the 6th frame of the multiframe formed by multiplexing the 12 frames and 'B' bit allocated to the 8th bit of each channel of the 12th frame of the same, in the case of the T1 link. At this time, each signaling bit is defined as a seizing signal, a seizing acknowledgment signal, an off-hook signal, a clear-forward signal, a clear-back signal, a release-guard signal, or a closing signal.

For example, the forward and backward signaling bits (A and B) sent from the E1 link in the normal state are '1' and '0', respectively. When a seizing for a particular channel is requested, the seizing signal forces the bits A and B of the corresponding channel at the calling user to be '0' and '0' and the seizing acknowledgment signal forces the bits A and B of the corresponding channel in the called user to be '1' and '1'. On the other hand, the forward and backward signaling bits A and B sent from the T1 link in the normal state are '0', respectively. In this case, the forward signal is '1' and the backward signal is '0' when seizing, whereas the forward and backward signals are '1', respectively, when responding As described above, when a designated channel is seized by the signaling bits for processing the trunk seizing, an outgoing office of the PSTN (120 of FIG. 1) exchanges the register signals with the R2 signaling part (230 of FIG. 2) of the trunk interface unit (132 of FIG. 1) through the seized channel, and then performs the R2 signaling.

Namely, the processor (250 of FIG. 2) performs the R2 signaling routine (S4 of FIG. 6) to process the R2 signaling, for the channel seized by the trunk monitoring routine (S3 of FIG. 6). When the R2 signaling routine S4 is performed, the information on digits and classes of the calling user's and called user's numbers is transmitted through the seized channel, in order to form a path between the called user and calling user.

As described above, when transmission for the digits of the calling user's and called user's numbers is finished by processing the R2 signaling, the processor 250 requires a modem allocation to an processor of the modem unit 134 via the IPC. The processor of the modem unit 134 transmits connectable modem channel information to the processor 250 of the trunk interface unit (132 of FIG. 1) by checking the normal stand-by modem unit 134. The processor 250 of the trunk interface unit 132 connects the seized channel to the allocated modem channel if there is a connectable modem. If there is no connectable modem channel, the processor of the modem unit 134 transmits all busy information to the processor 250 of the trunk interface unit 132. Accordingly, the processor 250 transmits a busy tone to the seized channel by controlling the tone generator (240 of FIG. 2).

Here, the R2 signaling routine may require additional information if necessary. In this case, more detailed operations for the R2 signaling are described in the international telegraph and telephone consultative committee (CCITT) Q.441 Standard.

Consequently, when the corresponding channel is connected through the digital switch, data are exchanged between the PC and the IP of the packet network. When a recovery request at the calling user or the called user is detected to release a call, their connection is released by transceiving, the recovery signal by a predetermined procedure.

As described above, the trunk interface unit of RAS according to the preferred embodiment of the present invention can accommodate T1 and E1 links within the same unit by exchanging line cards only, and process the line interface and signaling functions on the same unit. Therefore, RAS can be implemented with low cost.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A trunk interface unit for interfacing with a digital trunk of a PSTN in the RAS for connecting the PSTN to a different network, comprising:

a plurality of line card slots;

a plurality of E1 line cards inserted into said line card slots, for extracting and outputting a clock from bit streams received thereinto, generating a link state signal on E1 trunks, and arranging E1 frames according to an E1 system clock, thereby providing an interface of the E1 trunks;

a plurality of T1 line cards inserted into said line card slots, for extracting and outputting a clock from bit streams received thereinto, generating a link state signal on T1 trunks, and arranging T1 frames according to a T1 system clock, thereby providing an interface of the T1 trunks;

a clock selector for selecting a clock among the clocks outputted from said line cards according to a first control signal, and providing the selected clock as a reference clock;

a PLL for generating a main system clock synchronized with a frequency-divided reference clock;

a frequency-divider for frequency-dividing the reference clock and the main system clock, providing the frequency-divided reference clock to said PLL, and generating a plurality of system clocks including the E1 system clock from the frequency-divided main system clock;

a clock converter for converting the E1 system clock outputted from the frequency-divider into the T1 system clock and providing one of the E1 and T1 system clocks to said E1 or T1 line cards, according to a second control signal;

a digital switch for generating forward register data of a seized channel by switching time slots, transmitting PCM data received through each trunk to a modem unit, and transmitting the PCM data received from the modem unit and backward register data to a corresponding channel of said line cards, according to a first control data;

an R2 signaling part for decoding the forward register data received from said digital switch according to an R2 signaling protocol, generating the backward register data according to a second control data, and providing the generated backward register data to said digital switch; and a processor for generating and providing the first control signal to said clock selector by discriminating a link state from the link state signals, generating and providing the second control signal to said clock converter by discriminating the kind of said line cards inserted into said line card slots, performing a control sequence corresponding to the discriminated line cards, generating and providing the first control data for the time slots switching to said digital switch, and generating and exchanging the second control data for the R2 signaling with said R2 signaling part.

2. The trunk interface unit of claim 1, wherein each of said E1 line cards comprises:

a line interface part for being interfaced with a trunk link by a HDB3 line coding method, and providing the link state signal by checking a state of the trunk link; and a framer for performing an E1 multiframe synchronization by arranging bit streams received from said line interface part, and performing an E1 frame and multiframe synchronization by rearranging bit streams outputted from said digital switch, to provide the result to said line interface part.

3. The trunk interface unit of claim 1, wherein each of said T1 line cards comprises:

a line interface part for being interfaced with a trunk link by a B8ZS or an AMI line coding method, and providing the link state signal by checking a state of the trunk link; and a framer for performing a T1 multiframe synchronization by arranging bit streams received from said line interface part, and performing a T1 frame and multiframe synchronization by rearranging bit streams outputted from said digital switch, to provide the result to said line interface part.

4. The trunk interface unit of claim 1, wherein said R2 signaling part comprises:

an R2 receiver for decoding the forward register data outputted from said digital switch, and providing the decoded result to said processor; and an R2 sender for generating the backward register data according to the second control data outputted from said processor, and providing the backward register data to the corresponding channel of said digital switch.

5. The trunk interface unit of claim 4, wherein said R2 receiver comprises:

a serial/parallel converter for converting serial data outputted from said digital switch to parallel data;

a memory for storing the parallel data outputted from said serial/parallel converter;

a DSP for reading the parallel data from said memory and decoding R2 signaling information; and a register for storing the R2 signaling information decoded by said DSP.

6. The trunk interface unit of claim 4, wherein said R2 transmitter comprises:

a ROM for storing the backward register data;

an R2 sending logic for generating an address according to the second control data outputted from said processor, and reading the corresponding backward register data from said ROM according to the address; and a parallel/serial converter for converting the backward register data outputted from said R2 sending logic to serial data, and providing the serial data to said digital switch.

7. The trunk interface unit of claim 1, wherein said trunk interface unit further comprises a tone generator for generating various tones corresponding to a state of a call incoming office under the control of said processor, and providing the tones to said digital switch.

* * * * *